Sept. 22, 1953                E. C. GIBSON                 2,652,761
                                 PLOW
Filed Oct. 2, 1946                                    2 Sheets-Sheet 1
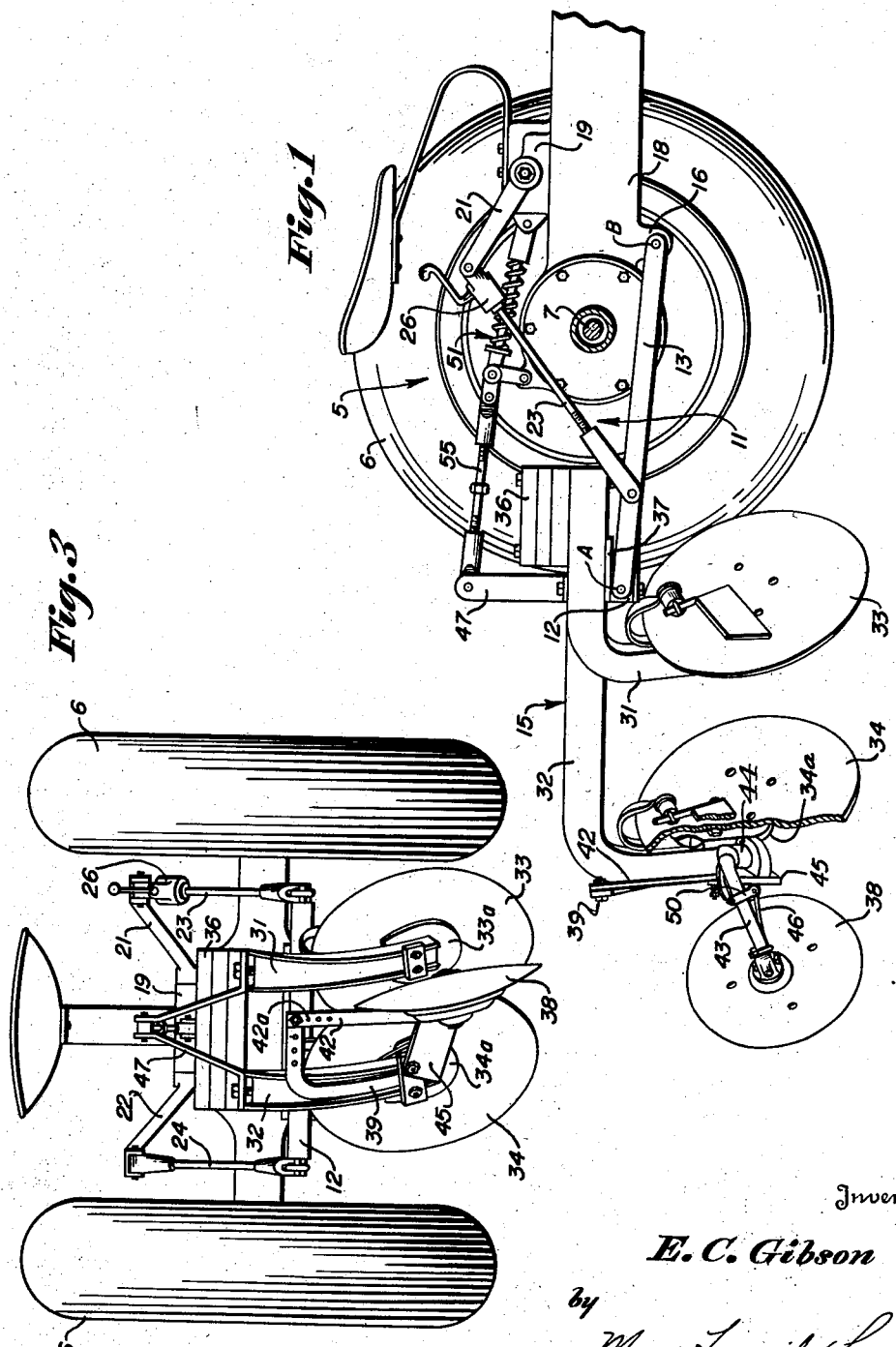
Inventor
E. C. Gibson

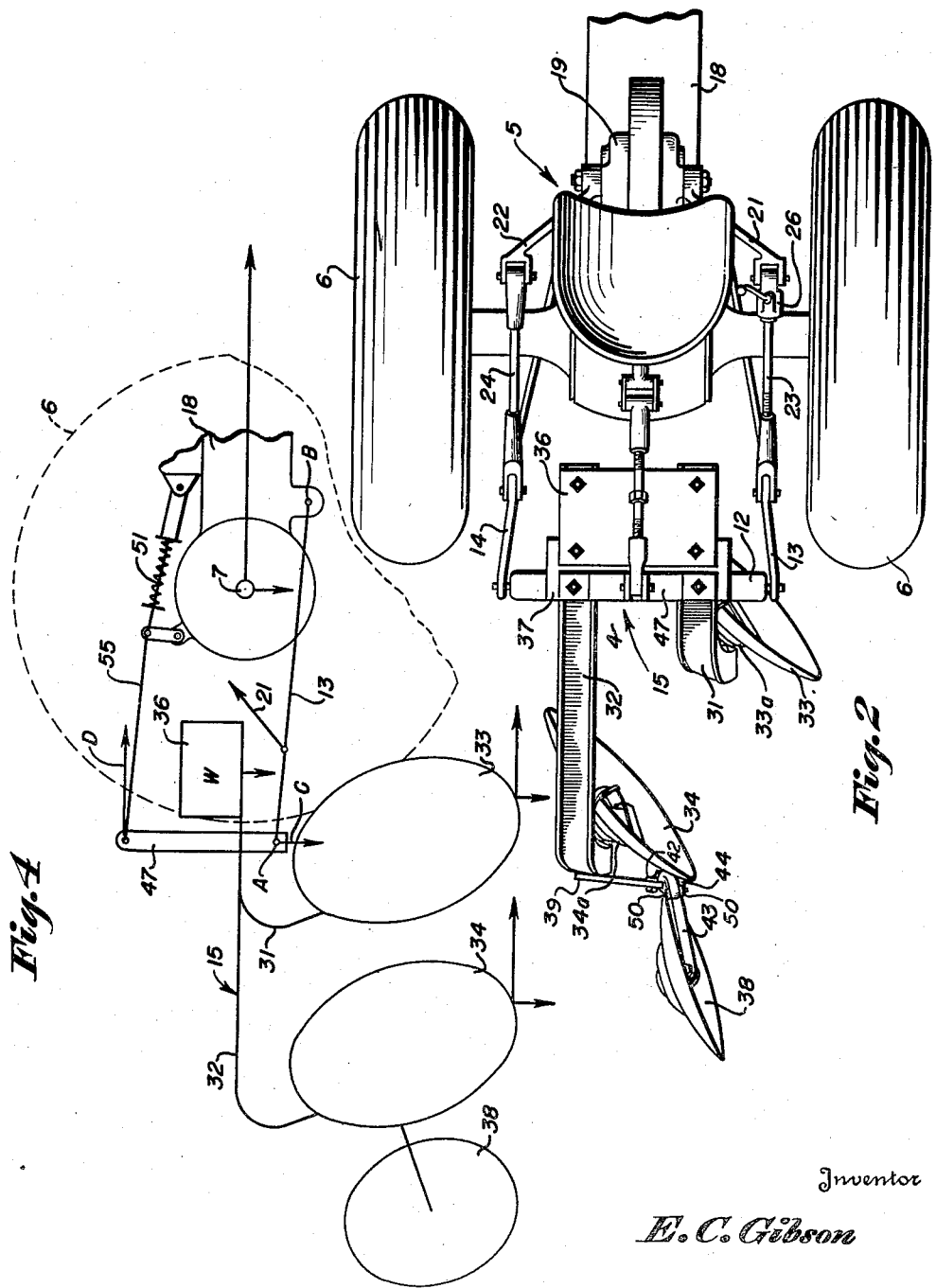

Patented Sept. 22, 1953

2,652,761

UNITED STATES PATENT OFFICE 2,652,761

PLOW

Eugene C. Gibson, Atlanta, Ga., assignor to Southern Iron & Equipment Company, Atlanta, Ga., a corporation of Georgia Application October 2, 1946, Serial No. 700,608

3 Claims. (Cl. 97—46.95)

This invention relates generally to agricultural implements and more particularly to tractor-mounted plows, commonly referred to as integral plows, in which the tractor itself serves as the carriage and controls the depth of plowing.

The general object and nature of the invention is the provision of an improved tractor-mounted plow having a plurality of furrow openers, such as disc or moldboard plows, in which the implement is closely coupled to the tractor in order that the integral unit can be maneuvered and handled with ease in small fields, terraced lands, on hillsides and in any other places where maneuverability and short turns are required. The invention resides in the construction and arrangement of the implement and in the novel manner in which it is attached to the tractor and novel manner in which the forward thrust of the tractor is applied to the implement.

With the advent of the pneumatic-tired, light-weight, high-speed tractor, the problem of obtaining sufficient traction was encountered. In many instances, it is necessary when plowing certain types of soil to add additional weights, either in the form of liquid in the pneumatic tires or in the form of heavy metal weights attached to the traction wheels. With integral type plows heretofore known, when plowing some types of soil, it was necessary to apply downward force to the plow in order to cause it to penetrate the soil and maintain a uniform depth. Obviously it was necessary that this downward force be supplied from the tractor. The resulting reaction on the tractor, in effect, reduced its weight and tended to reduce the traction and increase the slippage of the pneumatic-tired wheels. With the novel construction and arrangement of the present invention, an improved integral plow is provided in which the plow is pivotally connected to the tractor in such a way that there is sufficient downward force by reason of the draft of the plow bodies or furrow openers so that there is no upward thrust on the plow with the result that the tractor carries substantially the entire weight of the plow. The tail wheel shown in the present invention is not for the purpose of carrying the weight of the plow but merely for the purpose of resisting side thrust.

A major object of the invention is to provide an improved integral plow attached to the tractor in such a way that the total length behind the drawbar is reduced to a minimum to facilitate maneuvering and turning.

Another object is to provide an improved integral plow so attached and hitched that the furrow openers are substantially free-floating and, in the absence of disturbing forces, such as are encountered when striking hard objects like rocks and stumps, will be substantially in a state of equilibrium about the transverse pivotal connection to the tractor drawbar.

A still further object of the invention is to provide an improved integral plow so hitched to the tractor that there is substantially no upward thrust reaction on the drawbar whereby substantially the full weight of the plow will be carried by the tractor, thereby eliminating the necessity of adding weights to the tractor wheels in order to get necessary traction.

A still further object is to provide an integral plow provided with a coupling or hitch which produces a line of draft so that the tail wheel resists only side draft and carries substantially no weight of the plow.

Other and further objects will become readily apparent from the following description when considered in connection with the accompanying drawings, illustrating an embodiment of the invention, and in which:

Figure 1 is a side elevation of the rear portion of the tractor and integral plow with the near wheel removed and showing the manner of attaching the integral plow in accordance with the present invention;

Figure 2 is a plan view of the structure shown in Figure 1;

Figure 3 is a rear elevation view looking directly at the rear of the plow and tractor; and, Figure 4 is a schematic line diagram showing the points of attachment of the plow to the tractor and indicating the direction of the forces producing moments about the pivotal drawbar connection and illustrating the major novel features of the invention.

In the illustrated embodiment of the invention represented in the drawings, an integral plow is shown as mounted on the tractor and attached to a conventional drawbar furnished with the tractor. A conventional tractor 5 having suitable traction wheels 6, is illustrated in the drawings as being pneumatic-tired. The wheels 6 are mounted on a driving axle 7 which constitutes the center of the forward thrust of the tractor. The tractor is provided with a suitable drawbar mechanism 11 of known construction, particularly adapted for integral type plows.

The cross-shaft mechanism 11 includes transverse drawbar 12 which is pivoted about an axis, generally indicated by the letter A, transversely of the tractor in suitable side links 13 and 14. The forward ends of the links 13 and 14 are pivotally connected to bosses 16 and 17 respectively on gear housing 18. The gear housing 18 constitutes the main frame of the tractor. It is to be noted that the links 13 and 14 are pivotally connected to the gear housing 18 at points on a transverse axis indicated by the letter B which is parallel to the axle 7. As will become more apparent later, because the side links 13 and 14 are pivoted on the transverse axis B which is below the axle 7 and also below the transverse axis A of the cross-shaft 12, the forward thrust of the tractor produces a downward component of thrust on the plow which helps it to penetrate the soil during the plowing operation.

For purposes of lifting the cross-shaft 12 and with it the integral plow unit 15, suitable hydraulic mechanism 19 is provided for operating lifting arms 21 and 22. Suitable lifting links 23 and 24 respectively are connected between the ends of arms 21 and 22 and the side links 13 and 14, respectively. The lifting link 23 is provided with a suitable manually operable length adjusting mechanism 26 for the purpose of leveling the cross-shaft 12 or suitably adjusting it when one wheel of the tractor is running in the furrow. The mechanism described above is conventional and forms no part of the present invention.

The integral plow unit 15 comprises a plurality of tool beams 31 and 32 which carry furrow openers 33 and 34, respectively. The disc furrow openers 33 and 34 are carried by suitable bearing hubs which are suitably journaled to the respective beams at 33a and 34a. The forward ends of the tool beams 31 and 32 are rigidly connected together by a plurality of stacked transverse steel plates 36 which are engaged by bolts extending through the plates and through the beams. These plates serve the dual purpose of connecting the beams into an integral rigid unit and at the same time serve as a counterbalance for the weight of the rear furrow opener 34 and the tail wheel 38, for reasons which will become more apparent later in the description. Instead of the steel plates, a heavy casting could be substituted, if desired. Another transverse plate 37 is bolted to the tool beams 31 and 32 and also to the cross-shaft 12 and serves as the member through which the pulling thrust of the tractor is applied to the plow unit 15.

For reasons which will be explained later, the forward furrow opener or disc 33 is so arranged on the beam 31 that its point of penetration is below and slightly in front of the pivotal connection of the cross-shaft 12.

The tail wheel 38 is adjustably secured to the beam 32 and its sole purpose is to resist side thrust on the plow unit and not to carry any substantial weight of the plow which is preferably carried by the tractor. The tail wheel 38 is suitably journaled on the end of an arm 43, the forward end of which is rotatably mounted in a boxing 44 which in turn is carried on the end of an arm 45 bolted to the beam 32, the arm 45 being illustrated in Figure 3 and being disposed beneath and coextensive with the upper horizontal portion of the bracket 39 in the plan view of Figure 2. The angular position of the arm 45 is fixed by a link 42 which is pivotally connected at its lower end to arm 45 and has a plurality of holes 42a at its upper end to which it may be bolted at a desired position to a bracket 39 attached to the beam 32. A suitable leaf spring 46, having one end fixed to the arm 43 and its forward end connected by a link 50 to a boss on the boxing, is adapted to resiliently urge the disc tail wheel 38 downwardly for the purpose of supplying the necessary resistance to the side draft of the plow unit 15.

In order to maintain the plow unit 15 in a state of equilibrium about the transverse axis A of the cross-shaft 12, a V-shaped strut 47 is fixed to the top of the beams 31 and 32. The upper end of the strut 47 is pivotally connected to a suitable adjustable link 55, the other end of which is attached to suitable shock absorbing mechanism 51 attached to the tractor 5. The V strut 47 and the adjustable link 55 cooperate with the side links 13 and 14 and the cross-shaft 12 to position the plow unit 15 in its raised position and serves to stabilize the plow about the transverse axis A of the cross-shaft 12 when the plow is in operation. The main purpose of the V strut 47, the link 55 and the shock absorbing mechanism 51 are to stabilize the plow when shocks are encountered, such as when the plow strikes stumps or rocks, and to carry the weight of the plow in the raised position. The adjustability of the link 55 makes it possible to adjust the relative position of the furrow openers 33 and 34 about the pivotal axis A of the cross-shaft 12 to give various angles of pitch to the plow. The angle of pitch and the counterbalance weight gives the plow the necessary penetration. Due to the "suction" of the furrow openers 33 and 34, there is a downward thrust on the plow over and above that required for penetration of the plow and therefore it is necessary to carry this excess downward thrust by the tractor.

The novel features and advantages of the invention will be readily apparent from reference to Figure 4, where the same reference characters used in the other figures are used to indicate similar parts represented on the line diagram, and indicating the direction of forces acting on the plow unit 15 which tend to hold it in a substantial state of equilibrium about the axis A of the pivotally connected cross-shaft 12. It is desired to emphasize here that the arrows indicating the direction of the vector forces are not to scale, but are used merely for illustrative purposes. As previously pointed out, since the links 13 and 14 are pivotally connected on the axis B to the main frame 18 of the tractor 5 below and in front of the driving axle 7, the forward thrust of the tractor produces a downward component of thrust, indicated generally by the arrow C, on the furrow openers 33 and 34. Other forces which cause penetration of the plows are the "suction" of the plows and the weight W of the plurality of plates 36 or any casting which might be substituted therefor. It is to be noted that the pivotal connection, indicated by the axis A, of the plow unit 15 to the links 13 and 14, is above and just to the rear of the point of penetration of the forwardmost furrow opener 33. The "suction" of the discs 33 and 34 creates a moment in a counterclockwise direction about the axis A. In addition, since the forward thrust of the tractor is applied through the axis B which is below axis A, there is a downward thrust through axis A which is slightly in excess of that required to keep the plow in the ground.

Any resultant moment tending to rotate the plow unit 15 about the axis A, resulting from the operation of the discs 33 and 34, is resisted by a force, indicated by the arrow D, supplied by the strut 47 and the adjustable link 55. The excess downward thrust on the plow unit 15 through the axis A and about the axis B is taken by the hydraulic mechanism 19 through the links 21, 22 which are pivoted to the side links 13 and 14, respectively, which controls the depth of plowing. This excess downward thrust is therefore carried by the tractor. This is a very important feature because it, in effect, increases the weight of the tractor and reduces the slippage between the pneumatic-tired wheels and the ground. The tail wheel 38 does not carry any substantial weight of the plow, but is so adjusted that it bears sufficiently against the bottom of the furrow to resist any resultant side thrust of the plow 15.

Although the embodiment of the invention discloses a plow unit having only two furrow openers, because it is primarily concerned with an integral plow particularly adaptable for high maneuverability and short turning, it will be apparent that the principles of the invention could be applied to a plow unit having three or more furrow openers. The term "center of suction thrust" is used in reference to a point through which the downward thrust of the disc or plow may be considered to be concentrated.

Although the invention has been described in considerable detail, it will be apparent to those skilled in the art that many variations are possible without departing from the inventive concept. It is therefore desired that the invention not be limited except insofar as is made necessary by the prior art and by the appended claims.

I claim:

1. A plow comprising, a frame including a plurality of individual beams having longitudinal horizontal portions and depending portions, said horizontal portions being substantially parallel and in a common plane, a transverse weight member extending between said parallel portions and rigidly fixed thereto for the purpose of rigidly fixing said beams with respect to each other, a second transverse member extending between said parallel portions and rigidly fixed thereto, said second transverse member having means to which said plow may be pivotally connected to a tractor, the depending portions of said beams extending downwardly and toward the free ends of said horizontal portions, a disc type furrow opener mounted for rotation on the lower ends of each of said depending portions, and means including a lever arm extending from said rigid frame above said first pivotal means to which a pivotal means may be connected to a tractor for resisting pivotal movement about said first pivotal means.

2. An integral plow unit adapted to be carried by a tractor in free-floating relation therewith comprising, a frame including a plurality of individual beams having horizontal longitudinal portions and depending portions, said horizontal portions being substantially parallel and in a common horizontal plane, a transverse member extending between said longitudinal portions and rigidly fixed thereto, said transverse member having pivotal coupling means to which said plow may be pivotally connected to a tractor, a transverse counterweighting body extending between said longitudinal portions and rigidly fixed thereto, the depending portions of said beams extending downwardly and toward the free ends of said horizontal portions, a disc type furrow opener mounted for rotation on each end of said depending portions, one of said disc type furrow openers having its point of thrust forwardly of said pivotal coupling means and the remainder of said disc type furrow openers being disposed oppositely relative to said pivotal coupling means, said counterweighting body being disposed at the free ends of said longitudinal portions to balance said furrow openers in substantial equilibrium about said pivotal means and in free floating state, a draft connection between said plow and said tractor comprising laterally spaced elements having universal pivotal connection with said tractor and with said pivotal coupling means on said frame, a lever arm rigidly secured to and extending upwardly from said frame above the pivotal connection to said plow and a linkage connected between said lever arm and said tractor for resisting pivotal movement about said first pivotal means.

3. An integral plow unit adapted to be carried by a tractor in free-floating relation therewith comprising, a frame including a plurality of individual beams having horizontal longitudinal portions and depending portions, said depending portions of said beams extending downwardly and toward the free ends of said horizontal portions, a disc type furrow opener mounted for rotation on the ends of each of said depending portions, said horizontal portions being substantially parallel and in a common horizontal plane, a first transverse member extending between said parallel portions and rigidly fixed thereto having pivotal coupling means thereon, a transverse counterweighting body extending between said parallel portions and rigidly fixed thereto, said counterweighting body being disposed at the free ends of said horizontal portions to balance said furrow openers in substantial equilibrium about said pivotal coupling means and in a free-floating state, one of said furrow openers having its point of thrust forwardly of said pivotal coupling means and the remainder of said furrow openers being disposed rearwardly of said pivotal coupling means, a draft connection between said plow and said tractor comprising a primary linkage and a secondary linkage in superposed relation, said primary linkage comprising two horizontally spaced connecting elements pivotally connected to the coupling means of said first transverse member and to the tractor, and said secondary linkage comprising connecting means attached to the tractor and the plow and spaced from the plane of the elements of said primary linkage, each of said connecting means providing a degree of universal movement, and the axis of the secondary linkage being substantially parallel to the plane of the elements of said primary linkage whereby a trapezoidal linkage mechanism is provided so that the plane of the horizontal portions of said plow remain substantially horizontal for all operative relative positions between said tractor and said plow.

EUGENE C. GIBSON.

References Cited in the file of this patent

UNITED STATES PATENTS

| Number | Name | Date |
|---|---|---|
| 200,955 | Ward | Mar. 5, 1878 |
| 246,363 | Ball | Aug. 30, 1881 |
| 1,501,651 | Ferguson | July 15, 1924 |
| 2,195,515 | Ferguson | Apr. 2, 1940 |
| 2,195,516 | Ferguson | Apr. 2, 1940 |
| 2,309,750 | Carrington | Feb. 2, 1943 |
| 2,320,141 | Kott | May 25, 1943 |
| 2,339,225 | Strandlund | Jan. 11, 1944 |
| 2,351,473 | Benjamin | June 13, 1944 |
| 2,394,210 | Sherman | Feb. 5, 1946 |
| 2,440,550 | Martin | Apr. 27, 1948 |

OTHER REFERENCES

"Flexible Farming," copyrighted 1945 by Harry Ferguson, Inc., p. 15. Copy in Div. 1, 97-Ferguson Manuals.

"Plow Book," copyrighted 1941 by Ferguson-Sherman Mfg. Corp., p. 2. Copy in Div. 1, 97-Ferguson Manuals.